(12) United States Patent
Bliss

(10) Patent No.: US 6,286,534 B1
(45) Date of Patent: Sep. 11, 2001

(54) PRESSURE RELIEF VALVE SYSTEM INCLUDING A PILOT VALVE HAVING A RADIAL DAMPER MECHANISM

(75) Inventor: Craig F. Bliss, Taunton, MA (US)

(73) Assignee: Anderson, Greenwood LP, Wrentham, MA (US)

(*) Notice: Subject to any disclaimer, the term of this patent is extended or adjusted under 35 U.S.C. 154(b) by 0 days.

(21) Appl. No.: 09/481,380

(22) Filed: Jan. 11, 2000

(51) Int. Cl.[7] .................................................. G05D 16/10
(52) U.S. Cl. ........................ 137/14; 137/102; 137/492.5
(58) Field of Search ............................ 137/14, 102, 492.5

(56) References Cited

U.S. PATENT DOCUMENTS 4,285,362 * 8/1981 Taylor ........................... 137/492.5 X

* cited by examiner

Primary Examiner—Gerald A. Michalsky
(74) Attorney, Agent, or Firm—Grimes & Battersby, LLP

(57) ABSTRACT

A pressure relief valve system is provided with particular application for use in conjunction with a pressurized system containing an incompressible fluid. The system includes a main pressure relief valve in communication with the pressurized system and a pilot valve in communication with said main pressure relief valve. The pilot valve includes a pilot valve body; a pressure chamber that is always in communication with the system pressure; and a sense piston reciprocal in the pilot valve body and which is exposed to the pressure in the pressure chamber. Damping means are provided on the sense piston to improve control of the opening and closing of the valve system. Preferred damping means include at least one labyrinth damping ring that extends downward from the sense piston and is adapted to engage with an upwardly extended damping ring on a hydraulic damping plate. At least one labyrinth ring is adapted to engage at least one complimentary upwardly extending annular piston ring positioned below the sense piston so as to define a sense piston chamber which serves to provide a damping effect on the operation of the valve system.

19 Claims, 6 Drawing Sheets

PRESSURE RELIEF VALVE SYSTEM INCLUDING A PILOT VALVE HAVING A RADIAL DAMPER MECHANISM

BACKGROUND OF THE INVENTION

1. Field of the Invention

The present invention relates generally to a pressure relief valve system that includes a pilot valve and, more particularly, to such a valve system in which the pilot valve has a radial damper mechanism that when used in conjunction with a pressurized liquid system, permits better control of the opening and closing characteristics of the closure elements in such valves.

Pressure lines, i.e., pressure vessels and piping systems, are frequently designed with pressure relief valves located at various locations therein to protect the pressure line from excessive pressure. These pressure relief valves are selfactuated devices that are set to open when the pressure in the line reaches a predetermined, maximum safe pressure level, typically referred to as the maximum allowable working pressure. When the pressure in the line reaches this maximum allowable working pressure, the closure element of the pressure relief valve moves away from the inlet nozzle and process fluid is allowed to flow out of the pressure line through the pressure relief valve. This fluid flow will continue at a rate sufficient to prevent the pressure in the pressure line from rising above a maximum allowable overpressure.

When the pressure in the pressure line falls below the set pressure of the pressure relief valve, the closure element in the pressure relief valve returns to the closed position, i.e., in contact with the nozzle, which prevents any additional flow from the pressure line.

Pressure relief valves are self-actuated, in that the forces required to open such valves are provided by the fluid at the pressure relief valve inlet. A particular problem exists when the fluid in the pressure line is an incompressible liquid due to the inertia of the incompressible fluid. Frequently, when dealing with incompressible liquids, the valve prematurely closes because the fluid in the pipeline is slow to move forward to hold the closure element open. As soon as the valve closes, however, the pressure in the pipeline again spikes back to the original pressure level thereby causing the valve to re-open. When this occurs, the pressure relief valve may become unstable as the closure element begins to cycle at high frequency which can cause damage to the pressure relief valve and to the system is being protected by the pressure relief valve.

2. Description of the Prior Art

Several methods have been employed to prevent a pressure relief valve from operating in an unstable manner when used in conjunction with incompressible liquid systems. One method is to design the valve to open in a proportional manner such that pressure is maintained at the valve inlet. An example of such a spring-loaded, pressure relief valve is described in U.S. Pat. No. 4,130,130 that issued to R. Stewart on Dec. 19, 1978. Similar technology has been applied to pilot operated pressure relief valves that employ a modulating pilot that controls the opening of the valve closure element in a proportional manner. Examples of such a valve is described in U.S. Pat. No. 4,586,533 which issued to R. Estes on May 6, 1986; U.S. Pat. No. 4,863,098 which issued to L. Kolze on Sep. 5, 1989; U.S. Pat. No. 5,058,624 which issued to L. Kolze on Oct. 22, 1991; and U.S. Pat. No. 5,950,657 which issued to Y. Lai on Sep. 14, 1999. These methods have improved the ability of pressure relief valves to operate in a stable manner when used in conjunction with an incompressible liquid system, however instability can and does still occur under a variety of system operating conditions.

Another approach is to introduce a damper into the pressure relief valve design which serves to reduce the severity of any oscillation and eliminate the oscillation once a steady state condition is achieved after the pressure relief valve has opened. Dampers may include viscous dampers or snubbers, e.g. needle valves or fixed orifices in pilot operated pressure relief valve control lines. An example of a valve having such a damper is described in U.S. Pat. No. 4,799,645 which issued to K. Kramer on Jan. 24, 1989. Dampers are, however, generally costly and difficult to maintain since they are prone to clogging.

The current invention incorporates a new damper concept that can be incorporated into the internal components of a pilot operated pressure relief valve. It serves to reduce cost, eliminate the need for additional special maintenance, and overcome the potential for clogging.

SUMMARY OF THE INVENTION

Against the foregoing background, it is a primary object of the present invention to provide a pressure relief valve system that includes a pilot valve having a radial damping mechanism used in conjunction with a main pressure relief valve.

It is another object of the present invention to provide such a pressure relief valve system that is particularly adapted to control the opening and closing characteristic of its closure element when used in conjunction with a pressurized liquid system.

It is but another object of the present invention to provide such a pressure relief valve system in which the radial damping mechanism comprises at least one radial damping labyrinth ring in the pilot valve to control the rate at which fluid is allowed to enter and leave its damping chamber.

It is still another object of the present invention to provide such a pressure relief valve system in which the control of its closure member by the pilot valve is improved to limit the potential for oscillation of the closure element.

It is yet still another object of the present invention to provide such a pressure relief valve system that is less susceptible to unstable operation when used in conjunction with a pressurized liquid system.

It is but another object of the present invention to provide such a pressure relief valve system that is more resistant to clogged passages.

It is but still another object of the present invention to provide such a pressure relief valve system having a pilot valve with improved control of the main pressure relief valve without added restriction to the fluid flow either into or out of the pilot valve.

To the accomplishments of the foregoing objects and advantages, the present invention, in brief summary, comprises a pressure relief valve system that is particularly adapted to be used with a pressurized system containing a noncompressible fluid. The pressure relief valve system of the present invention includes a main pressure relief valve in communication with the pressurized pipeline and a pilot valve in communication with the main pressure relief valve. The pilot valve includes a pilot valve body, a pressure chamber that is always in communication with the system pressure, and a sense piston reciprocal in the pilot valve body that is exposed to the pressure in the pressure chamber.

The sense piston includes damping means to improve control of the opening and closing of the valve system. Preferred damping means include a labyrinth damping ring that extends downward from the sense piston and which is adapted to engage and form a restriction with a radial damping ring on the top of the hydraulic damping plate. The labyrinth damping ring includes at least one downwardly extending ring or projection that is adapted to engage at least one complimentary, upwardly extending, damping ring on annular flat surface positioned below the sense piston. This serves to define a sense piston chamber that provides a damping effect on the operation of the valve system.

BRIEF DESCRIPTION OF THE DRAWINGS

The foregoing and still other objects and advantages of the present invention will be more apparent from the detailed explanation of the preferred embodiments of the invention in connection with the accompanying drawings, wherein.

BRIEF DESCRIPTION OF THE PREFERRED EMBODIMENTS

Figure 1:
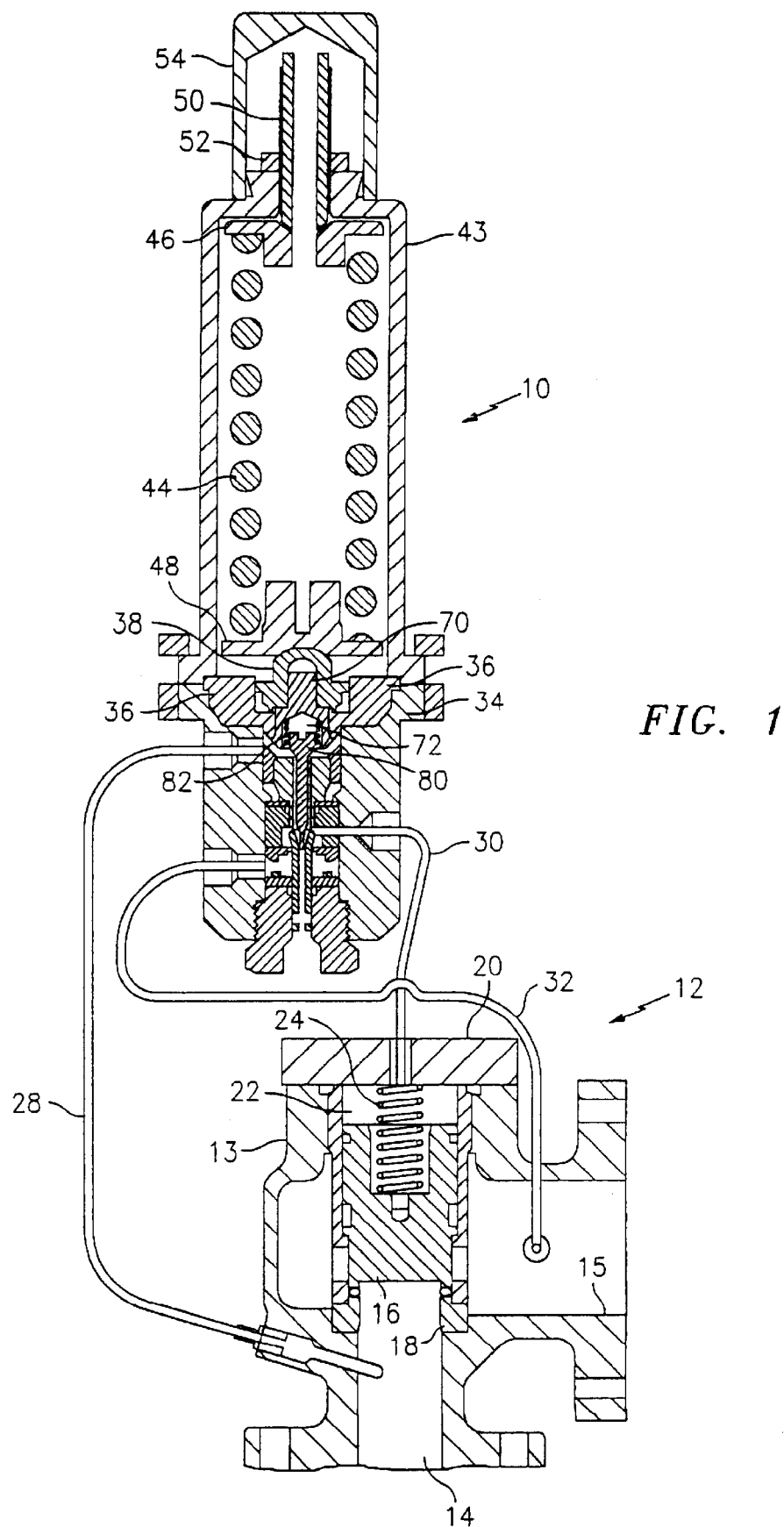
FIG. 1 is a sectional view of the pressure relief valve system of the present invention including a pilot valve having a radial damping labyrinth ring.

Referring to the drawings and, in particular, to FIG. 1 thereof, there is shown the pressure relief valve system of the present invention referred to generally by reference numeral 1. Pressure relief valve system 1 includes a pilot valve 10 that is mounted on a main pressure relief valve 12. It will be appreciated that the subject pilot valve 10 may be used in combination with other types of main pressure relief valves.

Figure 2:
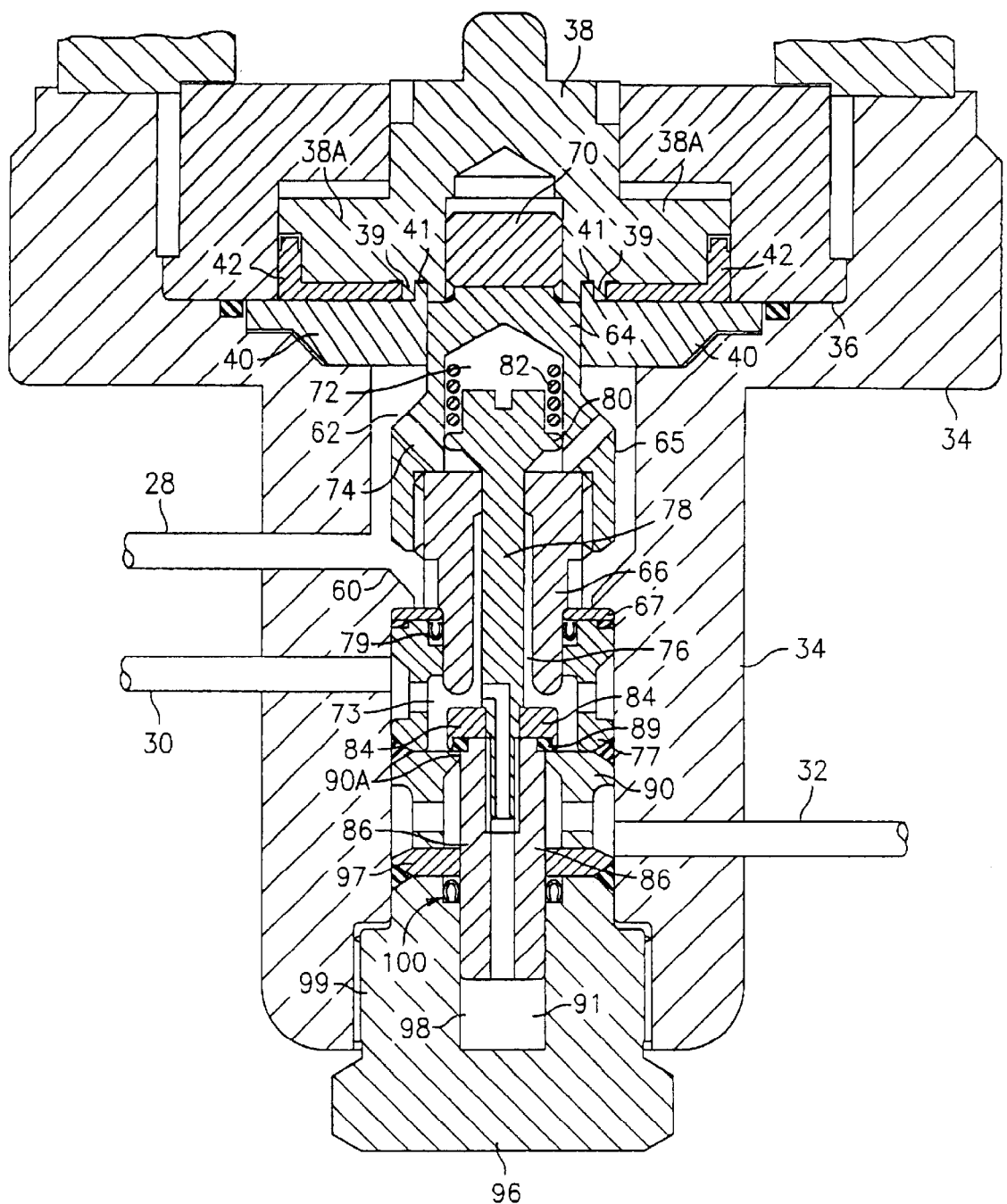
FIG. 2 is an enlarged sectional view of the pilot valve of FIG. 1 showing in greater detail the radial damping labyrinth ring.

As shown in greater details in FIGS. 1 and 2, the main valve 12 includes a body 13 with an inlet 14 connected in fluid communication with the pressurized fluid system to be controlled by the main valve 12 and an outlet 15 connected to exhaust. A main valve disc 16 is reciprocally mounted in the body 13 of the main valve 12 and is adapted to engage a main valve seat 18 to seal or retard communication between the inlet 14 and the outlet 15.

A top plate 20 is sealingly attached to the body 14 and forms, with the main valve disc 16, a main valve dome chamber 22. Pressure in the main valve dome chamber 22 acts to urge the main valve disc 16 against the seat 18, thus causing the main valve disc 16 to close. The effective area of the upper end of the main valve disc 16 upon which the dome pressure acts is greater than the effective area of the lower end of the main valve disc 16 upon which the system pressure acts. The pressure in the main valve dome chamber 22, which is controlled by the pilot valve 10, must be lower than the system pressure for the main valve disc 16 to open. The pressure differential between the main valve dome pressure and system pressure necessary to unseat or open the main valve disc 16 is called the upset ratio.

The pilot valve 10 has a pilot inlet conduit 28 which is connected directly to the inlet 14 of the main pressure relief valve 12 but may also be connected at a location remote therefrom (not shown) to communicate system pressure to the pilot valve 10. A second pilot valve dome conduit 30 connects the main valve dome chamber 22 of the main valve 12 with the pilot valve 10 and a third pilot exhaust conduit 32 connects the pilot valve 10 to exhaust. For convenience, exhaust may be the outlet 15 of the main pressure relief valve 12 downstream of the main valve seat 18, as shown, but it may also be any suitable connection to low pressure such as atmospheric pressure.

As best seen in FIGS. 1 and 2, the pilot valve 10 has a pilot valve body 34 with a recess having a guidance bore that is adapted to engage a complementary section on a replaceable piston adapter 36 that has a through bore in which a sense piston 38 is reciprocally mounted.

As shown in greater detail in FIG. 2, the sense piston 38 includes at least one, downwardly extending labyrinth damping ring 39 that extends from its bottom and which engages at its outer diameter the piston adapter 36. The damping ring 39 is adapted to engage a complimentary, upwardly extending, damping ring 41 on the hydraulic damper plate 40 which define a sense piston chamber 42 between the sense piston 38 and the hydraulic damper rings 40.

It will be appreciated that the sense piston chamber 42 defined by the engagement of the damping ring 39 on the sense piston 38 and damping ring 41 on the hydraulic damper plate 40 creates a damping chamber for the pilot valve 10. While it will not stop the opening and closing motion of the pilot valve 10 when the pressure relief valve 1 is opened and closed, it will, however, retard its motion sufficiently as a shock absorber. No seal is required since the engaging damping rings create a sufficient restriction. Fluid must pass through the damping rings in order for the sense piston 38 to move up and down since movement of the piston is dependent on the volume of fluid in chamber 42. The piston adapter 36 may be replaced to accommodate sense pistons 38 with diameters other than the one shown in order to vary the effective area and, therefore, the force exerted by any given pressure acting on the lower side thereof.

Figure 3:
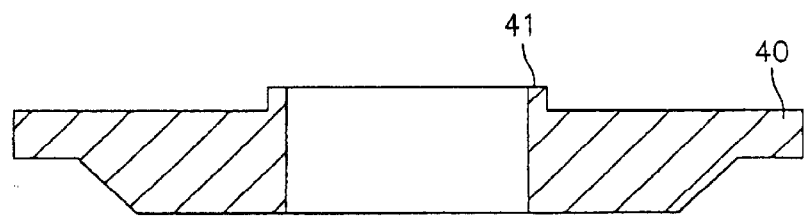
FIG. 3 is a enlarged side view of the hydraulic damper used in conjunction with the pilot valve of FIGS. 1 and 2.

FIG. 3 illustrates in greater detail the design and configuration of the hydraulic damper 40 with its upwardly extending damping ring 41.

As shown in FIG. 2, when the damping ring 41 of the hydraulic damper plate 40 engages the damping ring 39 of the sense piston 38, the previously known sensing chamber 42 is divided into two chambers separated by the radial hydraulic damping rings 39 and 41. These two chambers are newly defined as the sensing/damping chamber 42 and the inlet chamber 62.

A pilot valve bonnet 43 is secured to the pilot valve body 34 by bolts or other securing means. A compression range spring 44 is trapped between an upper spring washer 46 and a lower spring washer 48, which includes a recess for accepting a complementary projection formed on the upper side of the sense piston 38 to transfer the force exerted by the compressed range spring 44 to the sense piston 38. The upper spring washer 46 engages a threaded pilot adjusting sleeve 50 that extends through a threaded opening in the top of the pilot valve bonnet 43. The sleeve 50 allows adjustment of the pre-compression imposed on the range spring 44, and, as such, the minimum spring force applied to the sense piston 38.

The pilot valve body 34 is provided with a bore 60 and counter-bores that form a longitudinal channel with an enlarged inlet chamber 62 at its upper end that is always in communication with system pressure through pilot inlet conduit 28. The pressure in system chamber 62 acts on the effective area of the sense piston 38 to create a force to urge the piston 38 upward in opposition to the force of the range spring 44. A sleeve assembly 64 is slidable in the bore 60 and has an upper part 65 and a lower part 66.

The upper part 65 of the sleeve assembly 64 is connected to and, thus, moveable with the sense piston 38 by threaded engagement of a central projection 70 on the upper part 65 with a blind hole extending upward from the lower end of the sense piston 38. The upper part 65 of the sleeve assembly 64 has a longitudinal blind bore 72 and cross drilled passages 74 to communicate system pressure from the pilot inlet chamber 62 to the bore 72. The lower part 66 has a longitudinal through bore 76 whose diameter is smaller than the diameter of the blind bore 72 with a stem assembly 78 reciprocally mounted therein. The outer diameter of the lower part 66 of the sleeve assembly 64 reciprocates in a dome spool 77 inserted from the lower end of and is secured to the pilot valve body 34 and has a dynamic seal 79 penetrated by the lower part 66.

The stem sub-assembly is formed of an upper member 78 reciprocally mounted in and having a diameter smaller than the through bore 76 so that fluid may flow therebetween. The upper end of the member 78 is formed with an enlarged cylindrical head 80 which is reciprocal in and of a smaller diameter than the blind bore 72 so that fluid may flow therebetween. A compression stem assembly spring 82 is trapped between the end of the blind bore 72 and the top of the stem assembly head 80. The stem assembly spring 82 urges the head 80 on the upper member 78 of the stem assembly 78 into contact with the upper end of the lower part 66 of the sleeve assembly to block fluid communication between the inlet chamber 62 and the dome chambers 73 and 22 of the pilot valve 10 and the main valve 12, respectively.

The stem sub-assembly also includes an exhaust valve seat retainer 84 and an exhaust seat shoulder 86 which are each threaded onto the upper member 78 so that the seat retainer 84 abuts a shoulder formed on the upper member 78. In this manner, the seat retainer 84 abuts the seat retainer to form, with the upper member 78, a unitary structure. A seat 88 is trapped between the seat retainer 84 and the seat shoulder 86 when the shoulder 86 is threaded into and abuts the retainer 84. An exhaust seat spool 90 is inserted from the lower end into the pilot valve body 34 and butts against the dome spool 77. Exhaust seat spool 90 has a longitudinal bore 90A, the upper circular edge of which engages the seat 88. Washer 97 and retainer 99 are installed into the body from the lower end to secure the stop washer 67, dome spool 77, exhaust spool 90, and washer 97 into the body 34. The pilot dome conduit 30 communicates through the dome spool 77 with the annular space between the exhaust seat shoulder 86 and the exhaust seat 90.

In this manner, the seat 88 functions as an exhaust valve to isolate the pilot dome conduit 30 from the pilot exhaust 32 when closed, i.e., when engaged with the exhaust seat 90, and to connect the pilot dome conduit 30 with the pilot exhaust conduit 32 when open, i.e., when disengaged from the exhaust seat 90.

A plug 96 seals the outer end of the bore 91. The volume within the bore 91 between the lower end of the seat shoulder 86 and the upper end of the plug 96 is dynamically sealed from exhaust conduit 32 by a seal 100. This defines the dome balance chamber 98 which communicates with the pilot dome conduit 30 through an internal passage 101 formed in the stem assembly 78. Pressure in the dome balance chamber 98, which is always in communication with the main valve dome chamber 22, is controlled by the actions of the inlet valve and the outlet valve.

Thus, there are only two moving parts within the pilot valve 10, i.e., the sleeve assembly 64 and the stem assembly 78. The sleeve assembly 64 is free to reciprocate in the channel but its downward movement is limited by engagement of a stop washer 67 between the lower part 66 and the dome spool 77. The dimensions of the parts are such that when the system pressure is below the set pressure, the exhaust valve is seated, i.e., the washer 67 engages the lower end of 66 and the inlet valve is open, i.e., the head 80 is spaced above the upper end of the lower part 66 of the sleeve assembly. The pressure at which this occurs is determined by the compressive force of the range spring 44 as set by adjusting the adjusting sleeve 50. Under this condition, the system pressure is transmitted through the pilot inlet conduit 28 through the open inlet valve between the upper member 78 of the stem assembly 78 and the lower part of the sleeve assembly, through the radial ports in the dome spool 77 to the pilot dome conduit 30. Full system pressure is therefore present in the main valve dome chamber 22 of the main valve 12 causing the main valve disc 16 to be tightly seated.

Increases in system pressure are immediately transmitted through the pilot inlet conduit 28 to the sense chamber 62 of the pilot valve 10. When the system pressure reaches a predetermined value below the set pressure, the force from the system pressure applied upward on the sense piston 38 less downward force applied downward by the dynamic seal 79 plus the force applied upward by the pressure in the dome chamber 73 on the dynamic seal 79 just equals the force applied downward to the sense piston 38 by the range spring 44. Any further increase in system pressure will cause the sense piston 38 and the sleeve assembly 64 attached thereto to move upwardly just enough to close the inlet valve, i.e., the upper part 66 of the sleeve assembly will contact the head 80.

The seating of the inlet valve isolates the inlet chamber 62 from the pilot dome chamber 73 so further increases in system pressure cannot be transmitted to the main valve dome chamber 22. However, the stem assembly 78 remains unmoved which holds the exhaust seat 90 in a closed position so that the pilot dome chamber 73 is isolated from the pilot exhaust conduit 32. As system pressure rises beyond the inlet valve closing point which is slightly below set pressure, upward movement of the sense piston 38 will pull the sleeve assembly 64 in an upward direction. Because the sleeve assembly is in contact with the stem assembly head 80, this causes the stem assembly 78 to lift and just open the exhaust valve. With the exhaust valve just open and providing limited communication with the pilot exhaust conduit 32, pressure in the pilot dome chamber 73 will begin to drop. If system pressure stops rising at this point, the drop in pressure under the dynamic seal 79 causes the range spring 44 to move the sense piston 38 and the sleeve assembly 64 attached thereto in a downward direction.

Since the sleeve assembly 64 holds up the stem assembly 78, the stem assembly 78 will also move downwardly, thereby closing the exhaust valve. This reaction to the decrease in pressure in the pilot dome chamber 73 is referred to as negative feedback. Both the pilot valve 10 and the main valve 12 will remain stable in this condition, with both the inlet and exhaust valves closed. The pressure in the pilot dome chamber 73 and the main valve dome chamber 22 remain higher than the pressure differential or upset ratio required to open the main valve disc 16.

Subsequent increases in the system pressure will again open the exhaust valve further bleeding off pressure from the pilot dome chamber 73 and the main valve dome chamber 22. When the pressure in the main valve dome chamber 22 drops below the upset ratio, system pressure will raise the main valve disc 16 off its seat 18. Again, negative feedback, i.e., the loss of pressure on the lower side of the dynamic seal 79, will permit the range spring 44 to re-close the exhaust valve thus halting the loss of pressure from the main valve dome chamber 22. The main valve disc 16 will open only a proportional amount. Raising system pressure above the set value will again open the exhaust valve permitting a bleed off of main valve dome 22 pressure which is proportional to the increase in system pressure. As a result, the main valve disc 16 will also rise or open a proportional amount until the system pressure reaches a value between 2% and 3% above set pressure when the main valve disc 16 will be fully open.

When the main valve disc 16 opens, the system pressure is reduced to a point slightly above the set pressure. This reduces the pressure acting on the sense piston 38 and permits the range spring 44 to move the sense piston 38 downwardly to an equilibrium position wherein the inlet valve is open and pilot dome chamber 73 and the main valve dome chamber 22 begin to re-pressurize. The added pressure in the pilot dome chamber 73 adds an upward force to the dynamic seal 79 moving the sleeve assembly 64 and the sense piston 38 upwardly to re-compress the range spring 44 and close the inlet valve. The re-pressurization of the dome chambers is halted, thus causing the main valve disc 16 to close proportionally. As system pressure decreases to a level just below set pressure, the pressure in the main valve dome chamber 22 reaches the upset ratio and the main valve disc 16 closes. In this state, the system is again stable with the inlet valve closed and the main valve disc 16 closed.

It can be seen from the foregoing description that the pilot valve 10 is capable of a modulating action rather than a snap action in reaction to both small increases and decreases in system pressure. It will, however, provide snap action opening of the main valve disc 16 in response to large increases in system pressure. Thus, if the system pressure rises only slightly above set pressure, the pilot valve 10 will bleed the pressure in the dome chambers to a value that is just below the upset ratio of the main valve 12. This will allow the main valve disc 16 to open only slightly to relieve the overpressure condition at a low flow rate and to re-close the main valve disc 16 when the overpressure condition has been relieved. If, however, the system pressure increases to a higher value of overpressure, the pilot valve 10 will bleed the dome chambers to a lower pressure proportional to the overpressure causing the main valve disc 16 to open to a greater degree to cause fluid to flow to the exhaust outlet 15 at a higher rate. Then, as the pressure drops, the pilot valve 10 will modulate the main valve disc 16 back down to a closed position.

If at any time, the system pressure rises sharply above set pressure, the sense piston 28 will move upward compressing the range spring 44 a greater distance corresponding to the sharply higher system pressure. The sleeve assembly 64 will be pulled an equal distance causing the inlet valve to close and the stem assembly 78, which is pulled upwardly by the sleeve assembly, will rapidly open the exhaust valve. The dome chambers will be in full communication with the exhaust line 32 causing the main valve disc 16 to rapidly move to a fully opened position in a snap action manner. The pilot valve and the main valve 12 will remain stable in this condition until the system pressure begins to drop. Since system pressure usually falls gradually, the pilot valve 10 will modulate the main valve disc 16 back to a closed position as the system pressure decreases to set pressure, in the manner described above.

One of the advantages offered by the system of the present invention is that upon activation, the operation of the closure elements of both the main valve 12 and the pilot-operated valve 10 are controlled in an improved manner.

When the pressure relief valve system 1 of the present invention is used in conjunction with a pipeline containing an incompressible fluid, there are times when the pilot valve 10 will be subjected to abnormal pressure surges or pressure spikes which are present in the system fluid. These surges may be initiated when the main valve disc moves rapidly to a closed position and fluid flow stops suddenly. The annular damping rings 39 and 41 serve to control the rate of change of volume of the sense/damping chamber 42. When there are pressure spikes in the process fluid the damping rings 39 and 41 slow these rapid fluctuations in pressure from being transmitted to the sensing area, thereby allowing the spike to dissipate before triggering a response in the pilot valve 10 to rapid opening or closing of the main pressure relief valve 12, which could result in valve instability.

The damper performs its most critical function when the pilot valve 10 re-opens its inlet valve to fill the main valve dome chamber, to close the main valve disc. At the instant the inlet valve is opened the pressure in the inlet chamber drops rapidly causing the range spring to push the sensing piston and attached components in a downward direction due to the loss of pressure under the sensing piston. This loss of pressure is not immediately made up from the inlet conduit due to a delay in establishing a flow in this conduit. The damping rings 39, 41 restrict the loss of fluid from under the sense piston 38 so as to create a momentary cushion for the sense piston 38 until flow into the inlet chamber is established and stabilized. This maintains a controlled operation of both the pilot valve 10 and the main valve 12.

Figure 4:
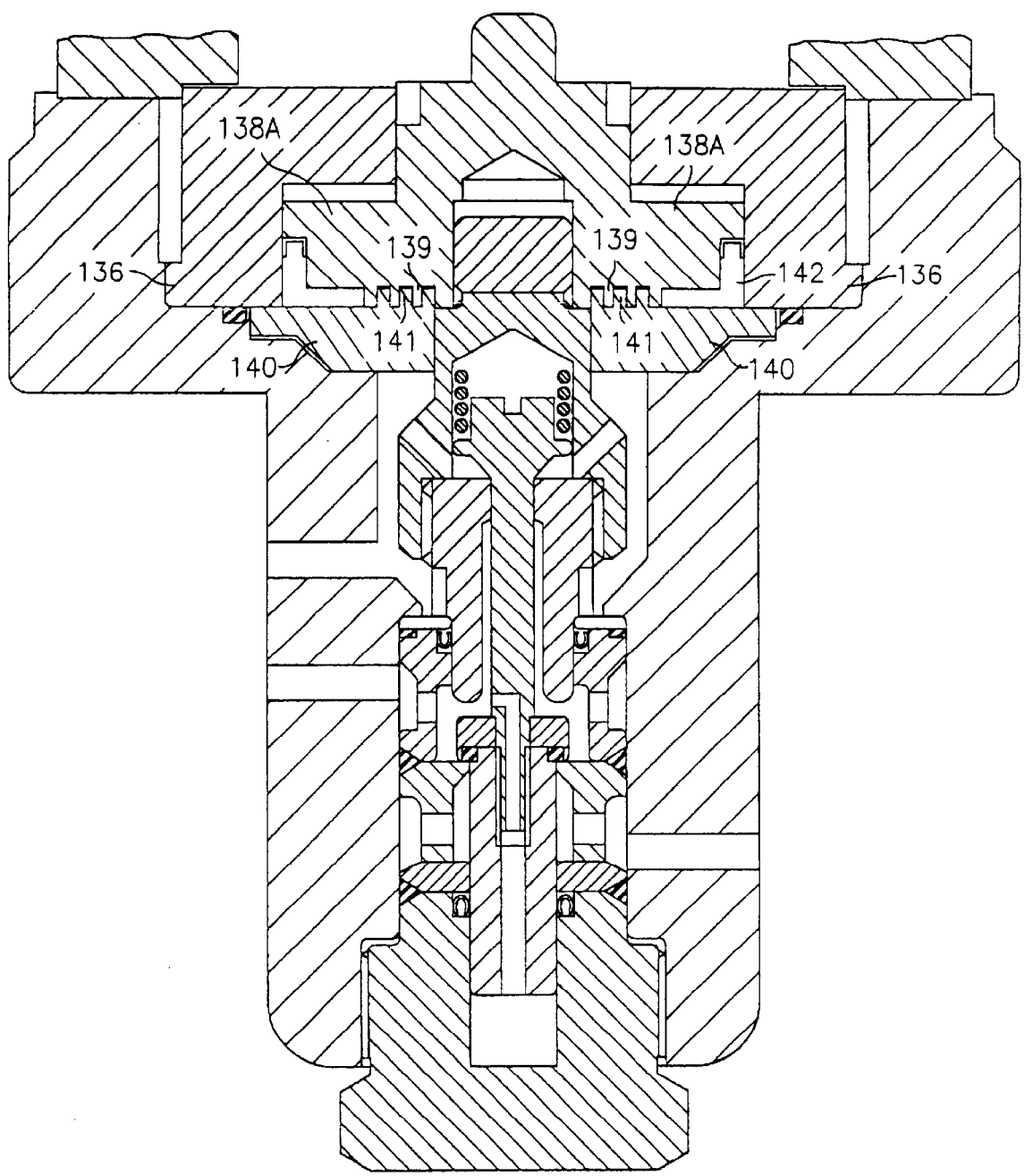
FIG. 4 is an enlarged sectional view of an alternative embodiment of the pilot valve of the present invention.

FIG. 4 illustrates an alternative embodiment of the present invention in which the sensing piston 138A has a plurality, of downwardly extending damping rings 139 which are adapted to engage a multiplicity of corresponding upwardly extending, complimentary damping rings 141 as part of hydraulic damper plate 140. These rings 139, 141 serve to define sense piston chamber 142 between the sense piston 138A and the hydraulic damper plate 140.

Figure 4A:
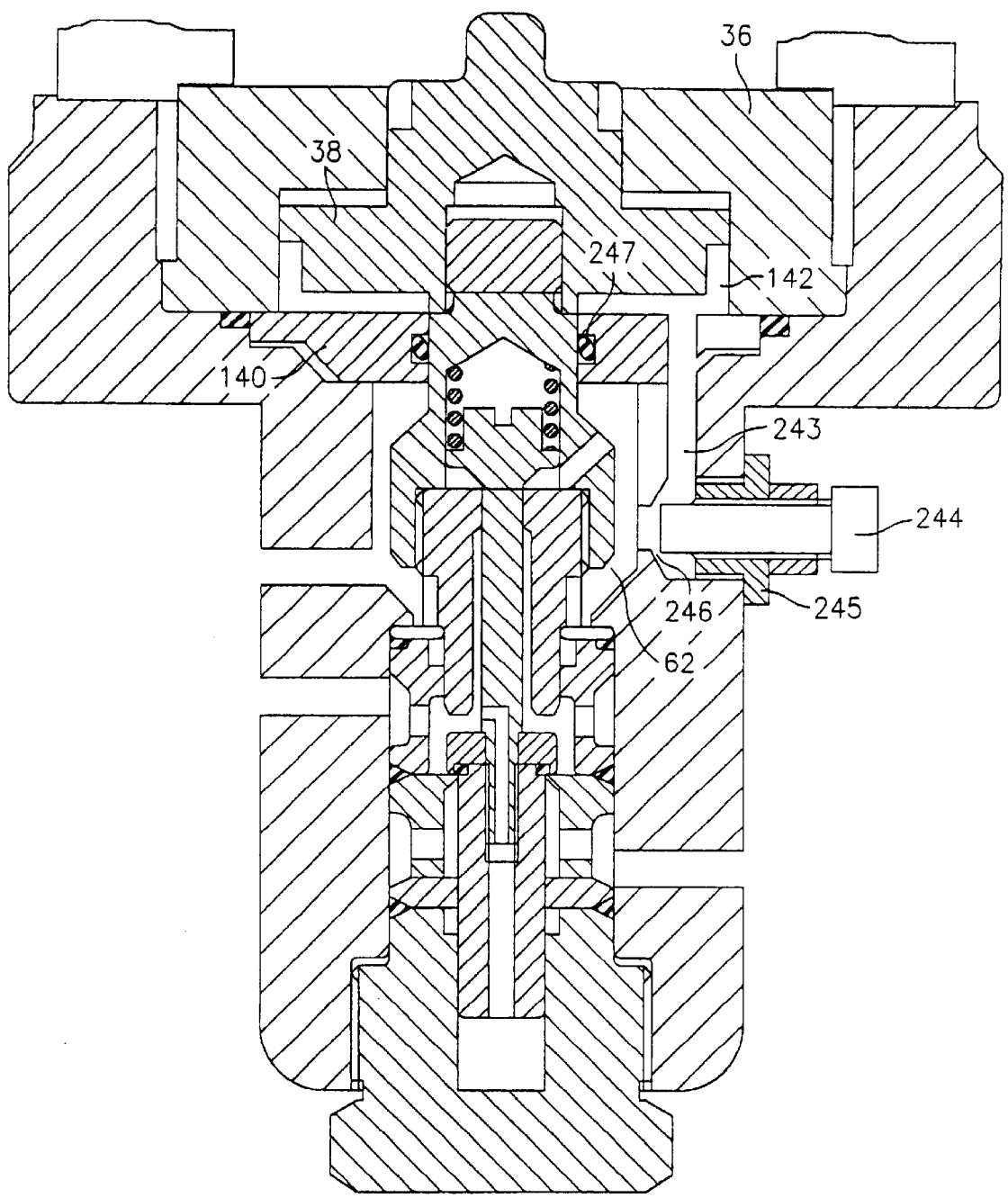
FIG. 4A is an enlarged sectional view of an alternate embodiment of the pilot valve of the present invention.

FIG. 4A illustrates an alternative embodiment of the present invention in which damping rings 39 and 41 are replaced by seal 247 between sensing chamber 42 and inlet chamber 62. In addition, a bypassing passage 243 is fitted to connect chambers 42 and 62. The connecting passage is fitted with an adjustable orifice 244 (shown) or alternately, can be fitted with a fixed orifice. As with the damping rings, the sensing chamber 42 is divided into two chambers, (42 and 62), but in this alternate embodiment, the two chambers are separated by a variable or a fixed orifice rather than the damping rings. This embodiment would perform essentially the same function as the damping rings.

Figure 5:
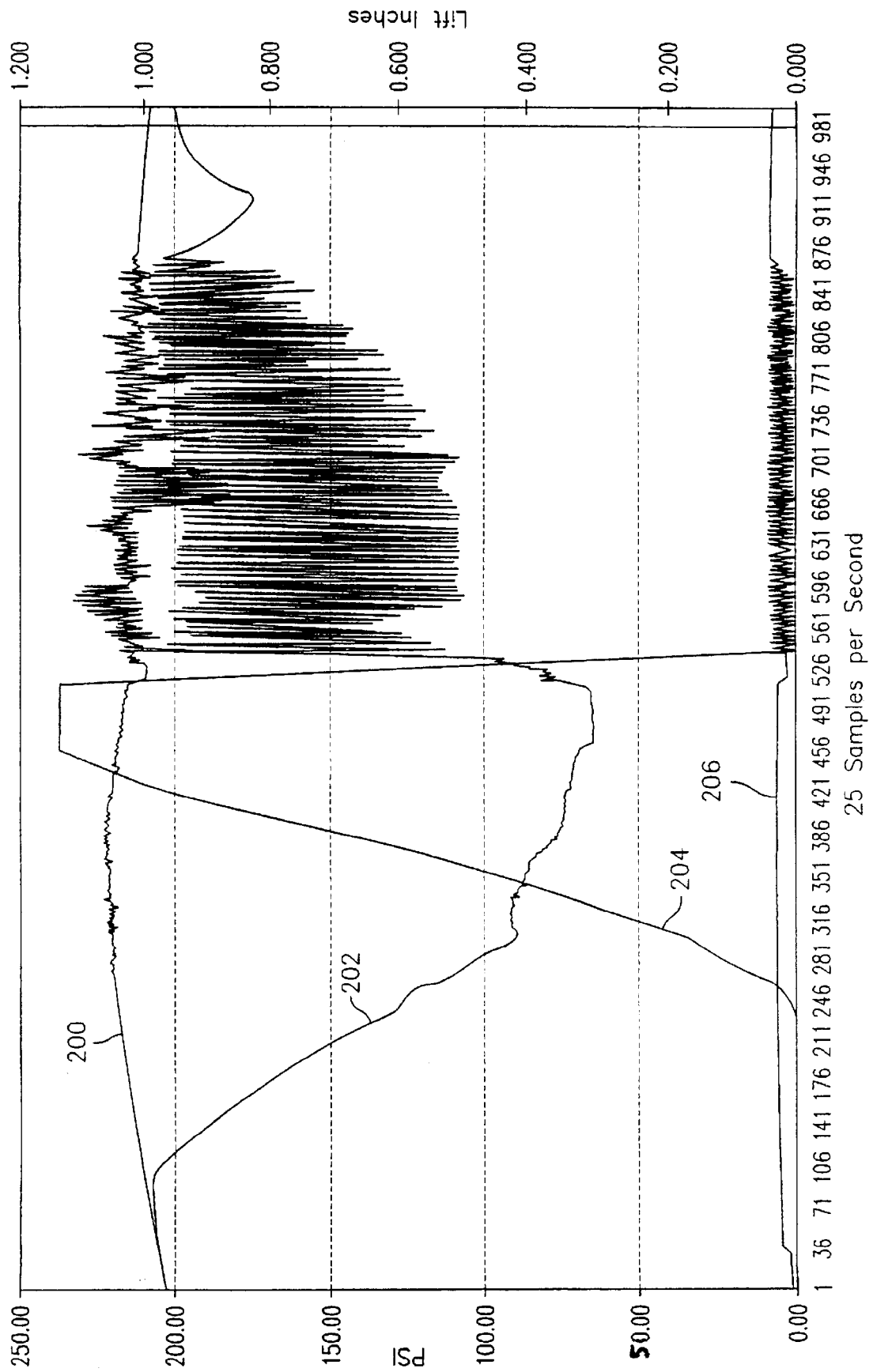
FIG. 5 is an oscilloscope graph illustrating the pilot lift and main lift of a conventional pilot operated pressure relief valve in operation.
Figure 6:
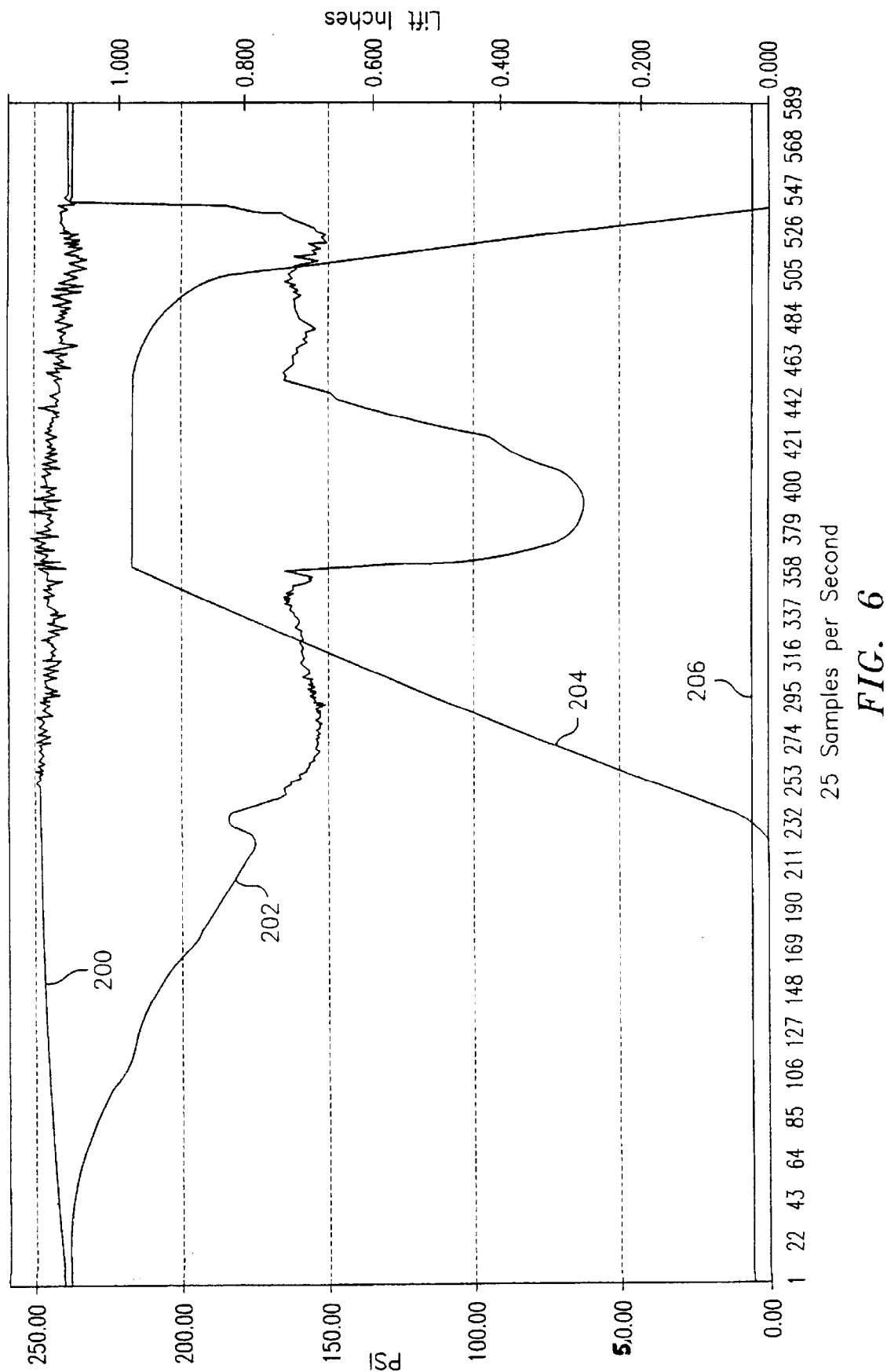
FIG. 6 is an oscilloscope graph illustrating the pilot lift and main lift of the pressure relief valve system of the present invention.

FIGS. 5 and 6 are oscilloscope charts indicating the amount of pilot lift and main valve lift as a function of system pressure and dome pressure in a conventional pilot operated pressure relief valve and in the valve of the present invention. FIG. 5 illustrates the system pressure 200, dome pressure 202, amount of main closure lift 204 and amount of pilot closure lift 206. It will be appreciated that at such pressure there is a significant amount of repetitive lifting of the main closure and pilot closure until ultimate stabilization.

FIG. 6 depicts a test run, with the same test conditions as shown in FIG. 5. It can be seen that at similar operating pressures, there is virtually no repetitive lifting of the main closure member and pilot closure member. This is due to the presence of the damping mechanism described herein.

Having thus described the invention with particular reference to the preferred forms thereof, it will be obvious that various changes and modifications can be made therein without departing from the spirit and scope of the present invention as defined by the appended claims.

What is claimed is:

1. A pressure relief valve system for use in conjunction with a pressurized system, said valve system including:
    a main pressure relief valve in communication with the pressurized system; and
    a pilot valve in communication with said main pressure relief valve and including:
        a pilot valve body;
        a pressure chamber in said pilot valve that is in constant communication with system pressure;
        a sense piston reciprocal in said pilot valve body that is exposed to the pressure in said pressure chamber;
        an inlet chamber; and
        damping means for improving control of the opening and closing of said valve system,
    wherein said damping means includes a hydraulic damping plate that servers to divide the inlet chamber into at least two chambers, one of which being a sensing/damping chamber.

2. The valve system of claim 1, wherein said sense piston includes at least one annular damping ring that extends downwardly from said sense piston and is adapted to engage and form a restricted passage with at least one complimentary annular damping ring that extends upwardly from said hydraulic damping plate.

3. The valve system of claim 2, wherein the engagement of the complimentary damping rings on the sense piston and the damping plate serves to restrict fluid flow between the inlet chamber and the sensing chamber and, thereby, a provide a damping effect during operation of said valve system.

4. The valve system of claim 2, wherein said sense piston and said hydraulic damping plate each include at least two damping rings.

5. The valve system of claim 1, wherein said damping means includes means for controlling the rate of change of the volume of fluid in said sensing/damping chamber.

6. The valve system of claim 1, further including a dynamic seal adapted to isolate said sensing/damping chamber from said inlet chamber, and further including a bypassing conduit fitted between said sensing/damping chamber and said inlet chamber.

7. The valve system of claim 6, wherein said bypassing conduit includes a variable orifice to control the rate of fluid flow into and out of said sensing/damping chamber to provide a damping effect during operation of said valve system.

8. A pressure relief valve system for use in conjunction with a pressurized system containing an incompressible fluid, said system including:
    a main pressure relief valve in communication with the pressurized system; and
    a pilot valve in communication with said main pressure relief valve and including:
        a pilot valve body;
        a pressure chamber in said pilot valve that is always in communication with system pressure;
        a sense piston reciprocal in said pilot valve body that is exposed to the pressure in said pressure chamber;
        an inlet chamber; and
        damping means for improving control of the opening and closing of said valve system, wherein said damping means includes a hydraulic damping plate that serves to divide the inlet chamber into at least two chambers including at least one sensing chamber and, further, wherein said sense piston includes at least one annular damping ring that extends downwardly from said sense piston and is adapted to engage and form a restricted passage with at least one complimentary annular damping ring that extends upwardly from said hydraulic damping plate to restrict fluid flow between the inlet chamber and the sensing chamber and, thereby, provide a damping effect during operation of said valve system.

9. The valve system of claim 8, wherein said sense piston and said hydraulic damping plate each includes at least two damping rings.

10. A pilot valve for use in conjunction with a pressure relief valve that is in communication with a pressurized system containing an incompressible fluid, said pilot valve including:
    a pilot valve body;
    a pressure chamber in said pilot valve that is always in communication with system pressure;
    a sense piston reciprocal in said pilot valve body that is exposed to the pressure in said pressure chamber;
    an inlet chamber; and
    damping means for improving control of the opening and closing of said pressure relief valve, wherein said damping means includes a hydraulic damping plate that serves to divide the inlet chamber into at least two chambers including at least one sensing chamber.

11. The pilot valve of claim 10, wherein said sense piston includes at least one annular damping ring that extends downwardly from said sense piston and is adapted to engage and form a restricted passage with at least one complimentary annular damping ring that extends upwardly from said hydraulic damping plate.

12. The pilot valve of claim 11, wherein the engagement of the complimentary damping rings on the sense piston and the damping plate serves to restrict fluid flow between the inlet chamber and the sensing chamber and, thereby, provide a damping effect during operation of said pressure relief valve.

13. The pilot valve system of claim 11, wherein said sense piston and said hydraulic damping plate each includes at least two damping rings.

14. A pilot valve for use in conjunction with a pressure relief valve that is in communication with a pressurized system containing an incompressible fluid, said valve including:
    a pilot valve body;
    a pressure chamber in said pilot valve that is always in communication with system pressure;
    a sense piston reciprocal in said pilot valve body that is exposed to the pressure in said pressure chamber;

an inlet chamber; and damping means for improving control of the opening and closing of said valve system, wherein said damping means includes a hydraulic damping plate that serves to divide the inlet chamber into at least two chambers including at least one sensing chamber and, further, wherein said sense piston includes at least one annular damping ring that extends downwardly from said sense piston and is adapted to engage and form a restricted passage with at least one complimentary annular damping ring that extends upwardly from said hydraulic damping plate to restrict fluid flow between the inlet chamber and the sensing chamber and, thereby, provide a damping effect during operation of said pressure relief valve.

15. The pilot valve of claim 14, wherein said sense piston and said hydraulic damping plate each includes a plurality of damping rings.

16. A pilot valve having an inlet conduit, a dome conduit, and an exhaust conduit for use in a pressurized system, said pilot valve having five distinct chambers including:

a balance chamber;

an exhaust chamber;

a dome chamber always in fluid communication with said balance chamber;

an inlet chamber;

a sensing/damping chamber in fluid communication with said inlet chamber; and damping means provided between said inlet chamber and said sensing/damping chamber.

17. The pilot valve of claim 16, said pilot valve further including means for damping instantaneous pressure fluctuations of said pressurized system without restricting flow through the relief valve system's inlet conduit, dome conduit and exhaust conduit.

18. A pilot valve of claim 17, wherein said damping means comprises a set of interlocking damping rings that provide an instantaneous restriction to flow between said inlet chamber and said sensing chamber.

19. A method for improving control of the opening and closing of a pressure relief valve used in conjunction with a pressurized system containing an incompressible fluid, said method comprising the steps of:

providing a pressure relief valve system including:
a main pressure relief valve;
a pilot valve in communication with said main pressure relief valve and including:
a pilot valve body;
a pressure chamber in said pilot valve;
a sense piston reciprocal in said pilot valve body that is exposed to the pressure in said pressure chamber;
an inlet chamber; and
damping means for improving control of the opening and closing of said valve system, wherein said damping means includes a hydraulic damping plate that serves to divide the inlet chamber into at least two chambers including at least one sensing chamber; and installing said valve system in said pressurized system such that the main pressure relief valve is in communication with the pressurized system and the pilot valve is in communication with said main pressure relief valve.

* * * * *